Aug. 16, 1938. O. E. FISHBURN ET AL 2,127,354

POWER TRANSMISSION

Original Filed Dec. 17, 1934 4 Sheets-Sheet 4

INVENTORS.
Otto E. Fishburn.
Herbert F. Patterson.
Richard C. Hand.
BY
Harness, Lind, Patee & Harris
ATTORNEYS.

Patented Aug. 16, 1938

2,127,354

UNITED STATES PATENT OFFICE 2,127,354

POWER TRANSMISSION

Otto E. Fishburn and Herbert F. Patterson, Detroit, and Richard C. Aland, Highland Park, Mich., assignors to Chrysler Corporation, Detroit, Mich., a corporation of Delaware Original application December 17, 1934, Serial No. 757,748. Divided and this application January 19, 1935, Serial No. 2,500

22 Claims. (Cl. 74—328)

This invention relates to driving mechanisms and refers more particularly, in one embodiment thereof, to improvements in driving mechanisms for motor cars or vehicles, especially where it is desired to vary the driving speed ratio between the vehicle engine or prime mover and the propelling ground wheels.

One object of our invention resides in the provision of an improved driving mechanism adapted, under predetermined desired conditions, to automatically effect the drive for the vehicle. Our driving mechanism is preferably adapted for use in connection with a speed ratio changing transmission and is adapted to establish an auxiliary driving speed ratio for the vehicle, such as an overdrive ratio, for example.

A further object of our invention resides in the provision of an improved driving or speed ratio changing transmission adapted to automatically respond in its actuation to predetermined desired conditions of operation of the vehicle. Thus, by way of example, we have provided an overdrive which is automatically effective in an improved manner when the vehicle attains a predetermined speed so that, on reaching this critical speed, the overdrive becomes effective and on falling below this critical speed, the overdrive becomes ineffective.

Another object of our invention is to improve and simplify the cooling of the gear driving mechanism employed in our overdriving mechanism. Thus, we have provided a lubricating oil reservoir with means for circulating the oil between the reservoir and overdrive mechanism. More particularly, we preferably utilize the transmission mechanism, which may have its speed changing gears manually controlled, for effecting a circulation of oil in conjunction with the overdrive mechanism between the casings of the transmission and overdrive mechanisms.

Further objects of our invention are to provide an improved casing structure for the transmission and overdrive mechanism; and to protect the operating parts of the mechanism from damage due to foreign particles which may find their way into the mechanism.

Still further objects of our invention reside in providing improvements in lubricating systems for power transmission mechanisms; in providing an improved lubricating system for planetary gearing especially of the type adapted for use in automatic transmissions such as an overdrive gearing.

This application is a division of our copending application Serial No. 757,748, filed December 17, 1934.

Further objects and advantages of our invention will be more apparent from the following illustrative embodiment of the principles of our invention, reference being had to the accompanying drawings in which.

In the drawings we have illustrated our driving mechanism A interposed between a speed ratio changing transmission B and the driven shaft 10, the latter extending rearwardly to drive the rear wheels (not shown) of the motor car or vehicle in the usual well-known manner, it being understood that we have elected to show our invention in association with a motor vehicle drive although our invention in its broader aspects is not necessarily limited thereto. Furthermore, our driving mechanism may be used to advantage at various other points in the line of general power transmission between the vehicle engine and the driven wheels, or between driving and driven means such as shafts of other types of devices.

The transmission B may be of any suitable type such as the conventional selector type operated in the well-known manner through usual selector controls whereby the various adjustments may be made to the transmission in order to provide the speed ratios in the line of drive through the transmission.

In order to realize certain advantages of our invention in a very simple manner, as will be more apparent hereinafter, we preferably provide a transmission B of the type having helical gears so that the helices, in addition to providing well-known advantages in the transmission art, provide further functions of pumping and circulating the lubricant in a novel manner in connection with the driving mechanism as a whole. Thus, as will be later described in greater detail, the helical gears are preferably so arranged that they pump lubricant for transmission B into the overdrive casing portion A without requiring an added pump.

The power coming from the usual engine or other prime mover (not shown) which may be located forwardly of the transmission B drives the transmission from the engine drive shaft 11 and the power is taken from this transmission by a power driving means or shaft 14 having a forward piloting end rotatable in a bearing 15, the shaft having a reduced portion 19 extending rearwardly into the portion of casing which contains the driving mechanism A. The drive shaft 14 slidably and loosely receives a collar 20 having an annular groove 21, this collar having a rearward sleeve portion 16 terminating in a reduced splined hub portion 17 which slidably engages corresponding splines 18 formed exteriorly of the reduced shaft portion 19. The hub 17 provides a clutch shiftable along splines 18 by the collar 20 as will be presently apparent.

The parts of transmission B will be only briefly described as follows. The casing provides a bearing B' for the shaft 11, the latter having a rearward hollow portion receiving the aforesaid bearing 15 and the piloted forward end of shaft 14. The rear portion of shaft 11 is provided with a gear $B^2$ in constant mesh with a gear $B^3$ of the usual countershaft $B^4$, the latter having second speed gear $B^5$, low speed gear $B^6$ and reverse gear $B^7$. Journalled on shaft 14 is the second speed gear $B^8$ in constant mesh with gear $B^5$, a shiftable clutch $B^9$ being selectively engageable with clutch teeth $B^{10}$ and $E^{11}$ to provide direct and second speed drives from shaft 11 to shaft 14 as will be readily understood. The clutch $B^9$ is illustrated as having the synchronizing member $B^{12}$ of known construction and operation. A shift lever $B^{13}$ is manually rocked on pivot $B^{14}$ in the usual manner to shift the rails $B^{15}$, the latter having fingers $B^{16}$ and $B^{17}$ respectively engaging clutches $B^9$ and the low speed and reverse gear 12. Gear 12 is slidable on the helical splines $B^{18}$ of shaft 14 to selectively engage low speed gear $B^6$ or the reverse idler 13 which is in constant mesh with gear $B^7$. It will be noted that the transmission gears have inclined or helical teeth, the teeth being inclined in relation to the direction of rotation of the gears to pump lubricant from the transmission reservoir $B^{19}$ to the overdrive casing $B^{20}$ as will be presently more apparent.

The driven shaft 10 extends forwardly in bearing 22, the usual speedometer take-off drive being illustrated at 27.

Our driving mechanism A provides, among other things, an auxiliary driving means or mechanism between the driving and driven shafts 14 and 10 respectively, this driving means being preferably of a construction adapted to provide a speed ratio between these shafts of an overdriving character whereby driven shaft 10 may, under certain conditions hereinafter described, be driven from the driving shaft at a speed greater than a direct drive between these shafts, it being understood that the engine and driving shaft 14 will in such instances be relatively slowed down with respect to their normal speed of actuation for a given speed of vehicle travel. If desired, the mechanism A may be rearranged to provide an underdrive instead of an overdrive, although we prefer to arrange the gearing for an overdrive of the driven shaft 10.

Figure 1:
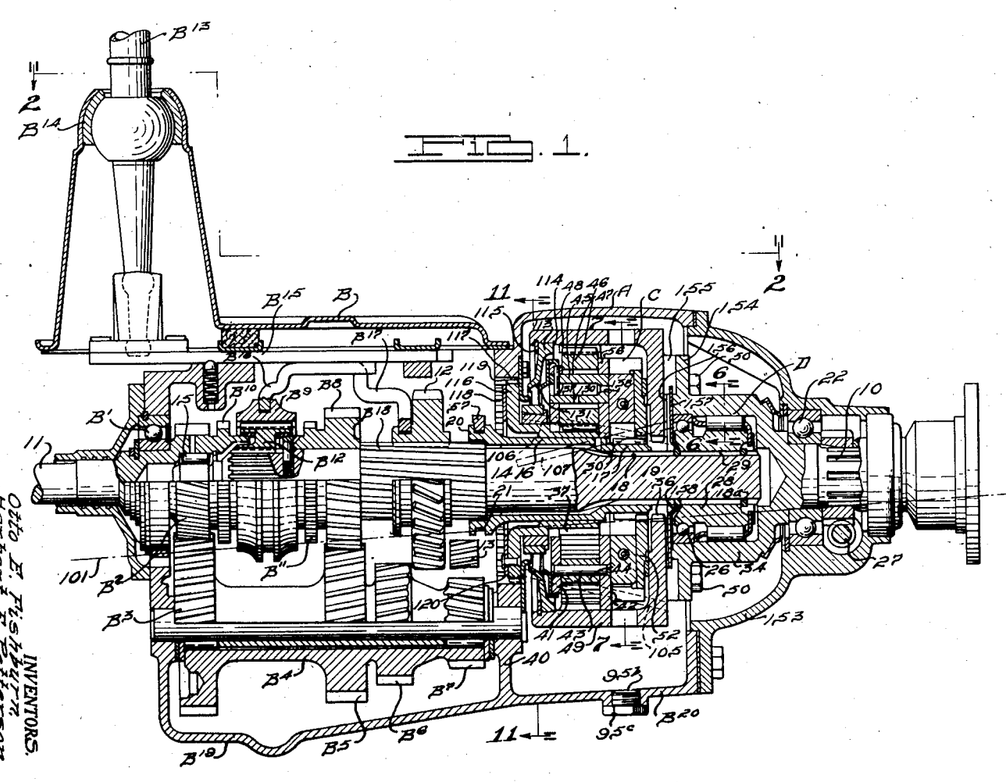
Fig. 1 is a sectional elevational view through the driving mechanism including the transmission and overdrive mechanism.
Figures 5, 6, 7, 8, 9, 10:
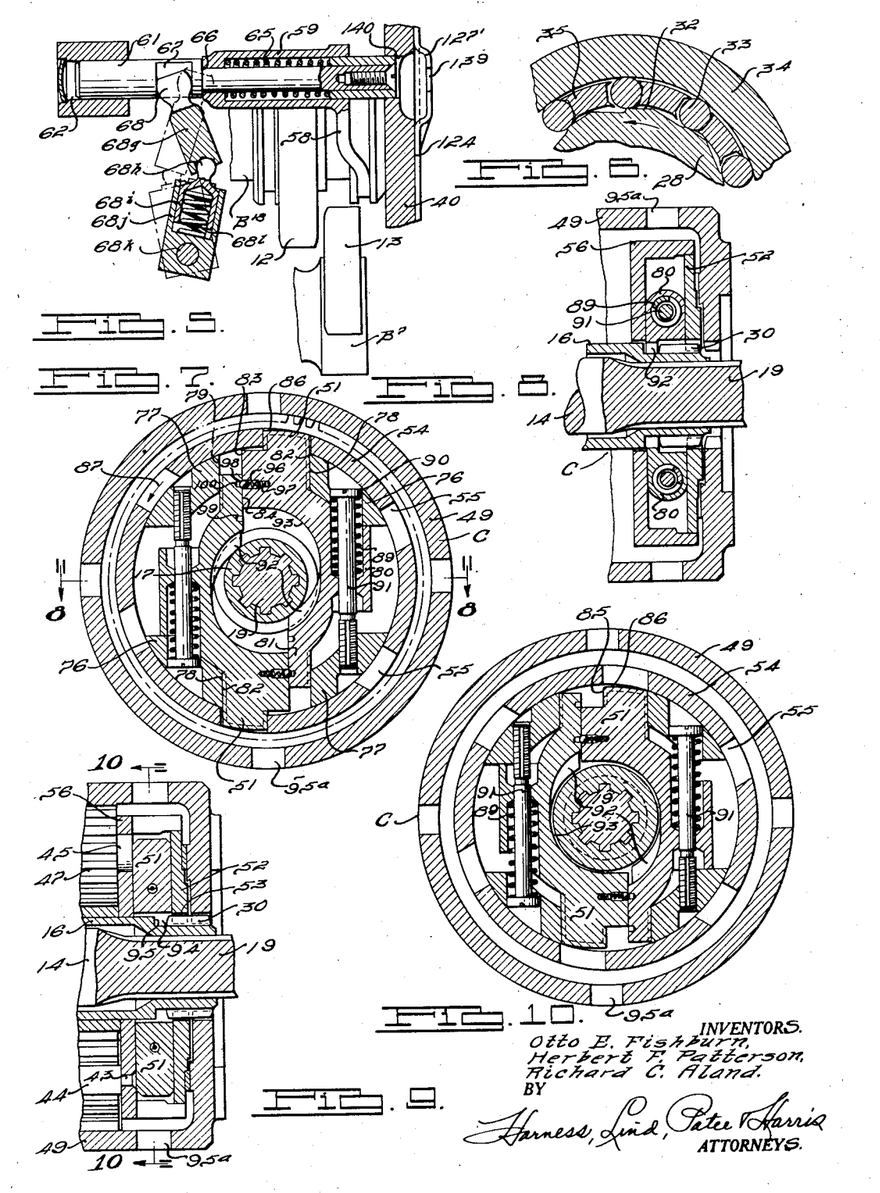
Fig. 5 is a detail sectional view of a portion of the manual control mechanism taken as indicated by the line 5—5 of Fig. 4.
Fig. 6 is a sectional view through a portion of the overrunning clutch taken as indicated by line 6—6 of Fig. 1.
Fig. 7 is a sectional elevational view along line 7—7 of Fig. 1 showing the automatic clutch in its engaged position.
Fig. 8 is a sectional view of the clutch illustrated in Fig. 7, the section being taken along line 8—8 of Fig. 7.
Fig. 9 is a detail sectional elevational view of only a portion of the mechanism illustrated in Fig. 1 showing the automatic clutch in the disengaged position, the manually controlled clutch being also shown in another of its positions of control.
Fig. 10 is a view similar to Fig. 7 but showing the automatic clutch in its disengaged position, the view being taken along the line 10—10 of Fig. 9.

We preferably incorporate in our driving mechanism as a part of the primary driving means between driving shaft 14 and driven shaft 10, an overrunning or free wheeling clutch D best shown in Figs. 1 and 6. This clutch may in itself be of any suitable form, the illustration showing a conventional device in which the inner cam member 28 is driven by internal teeth 29 engaged by the aforesaid teeth 18 of the reduced portion 19 of shaft 14. A ring $18^a$ prevents rearward displacement of cam 28. The inner cam member 28 has cam faces 32 engaged by cylinders 33 so that by the driving rotation of shaft 14, the high sides of cam faces 32 will wedge the cylinders 33 between cam member 28 and the outer cylindrical driven member 34 of the overrunning clutch to establish a direct drive thereto. The usual spacers 35 maintain the cylinders 33 in spaced position, and since the driven free wheeling part 34 is a forward extension of driven shaft 10 as shown in Fig. 1, it will be apparent that whenever the engine or driving shaft 14 shows down, the vehicle and driven shaft 10 may, by reason of the clutch D overrun the driving shaft, other conditions permitting such action as will be presently apparent.

A bearing 26 is provided between the inner and outer portions 28 and 34 of the clutch D forwardly of rollers 33. Forwardly of bearing 26 the clutch portion 34 has an inner annular extension provided with an annular series of internal clutch teeth or jaws 36 complementary to external teeth 30 of the shiftable clutch 17, the teeth 36 and 30 being adapted to interengage when the sleeve 16 is shifted rearwardly as will be presently apparent.

Referring now to the auxiliary driving gearing, we have illustrated this gearing as a planetary gearing although if desired other forms of gearing may be employed. In the illustrated embodiment and referring particularly to Fig. 1, the planetary gearing comprises a sun gear 37 fixed in a novel manner, hereinafter further described, to the transverse wall 40 between transmission B and the overdrive mechanism A, the shaft 19 and shiftable sleeve 16 freely rotating within this sun gear. A planet carrier is provided with axially spaced rings 41, 42 connected at circumferentially spaced intervals by the tie members 43, the planetary carrier rings 41, 42 being maintained in spaced relationship by sleeves 44 respectively carried by the tie members 43. In Fig. 1, we have illustrated one of these tie members 43 and associated sleeve 44.

Spaced circumferentially between the tie members 43 and the planet gear shafts 45 supported by the rings 41, 42 and journalled by a bearing 46 on each of the shafts 45 are the planetary gear pinions 47 meshing with the aforesaid sun gear 37. The planetary gears 47 also mesh with an internal gear 48 carried by a cylindrical sleeve 49 which projects forwardly from the outer member 34 of the free wheeling clutch D. The sleeve 49 may be formed as a part of the member 34 or may be rigidly connected thereto as by fasteners 50 shown in Fig. 1. The sleeve 49 has its axis concentric with the axis of shaft 14.

Our clutch C, best shown in Figs. 7, 8 and 10, preferably of the automatic type, has its centrifugally actuated pawls or dogs 51 carried by a pawl cage 52 which has an annular series of internal clutch teeth 53 slidably engaging the teeth 30 of the clutch 17 preferably continuously for both the forward and rearward positions of clutch 17 as shown in Figs. 1 and 9.

The companion cooperating clutch member of the automatic clutch C is provided by a cylindrical shell or sleeve 54 having an annular series of spaced pawl receiving slots or openings 55, the shell 54 having an inwardly extending forwardly located plate or flange 56 receiving the rearwardly extending ends of the planetary gear shafts 45 whereby the shell 54 is driven by the planetary gears 47. Further details of the clutch C will be described hereinafter.

Figure 2:
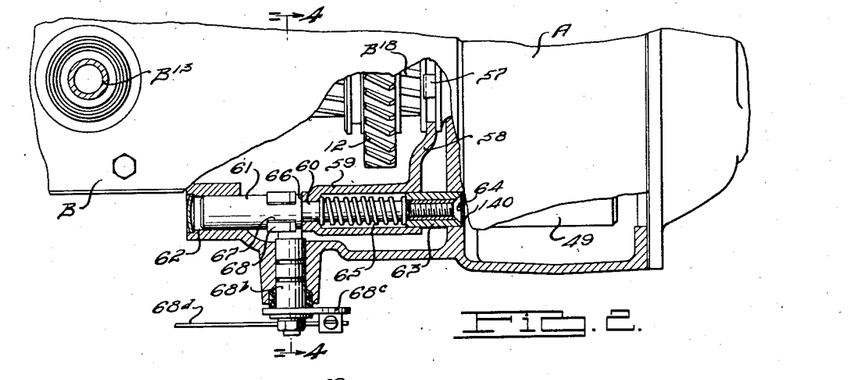
Fig. 2 is a partial top plan view of the driving mechanism with parts of the casing structure broken away, the view being taken as indicated by the line 2—2 of Fig. 1.

The aforesaid annular groove 21 of collar 20 is engaged by a yoke 57, a portion of which is shown in Fig. 1, this yoke extending laterally through an arm 58 as seen in Fig. 2. The arm 58 is provided with a hollow hub 59 having a forward end slidably receiving the reduced portion 60 of the rod 61, the latter having its forward end slidable in the casing bore 62. The rear end of hub 59 slidably receives an abutment sleeve 63 secured against rearward displacement along rod portion 60 by a screw 64 threaded in the rod. Acting between sleeve 63 and the forward end of hub 59 is a spring 65 reacting against the sleeve and urging hub 59 forwardly against the shoulder 66 of rod 61.

The rod 61 has slots 67 receiving the upwardly extending forks 68 of a lever 68ª rotatably journalled by a lateral shaft 68ᵇ which projects outwardly through the casing to receive the lever 68ᶜ having its lower end connected to an actuating linkage such as a Bowden wire 68ᵈ. Lever 68ᶜ is slotted at 68ᵉ to receive a screw 68ᶠ to limit the swinging movement of the lever about its shaft 68ᵇ.

Figure 4:
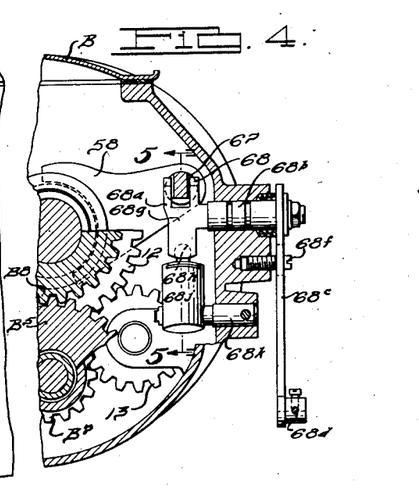
Fig. 4 is a transverse sectional elevational view taken as indicated by the line 4—4 of Fig. 2.

The lever 68ª has a downwardly extending lever arm 68ᵍ (see Fig. 5) provided with a socket engaged by ball 68ʰ. This ball is a part of plunger 68ⁱ slidably mounted in the upwardly opening cylinder 68ʲ mounted for oscillation on a shaft 68ᵏ (see Fig. 4). A spring 68ˡ acts between plunger 68ⁱ and cylinder 68ʲ and in the Fig. 5 position tends to hold the rod 61 in its forward position illustrated. When lever 69ᶜ is actuated to swing lever 68ª toward the dotted line position, the angle between the plunger and cylinder is reversed and spring 68ˡ then urges rod 61 rearwardly. Rod 61 is also held forwardly by a manually operable device in addition to the action of spring 68ˡ as will be presently apparent.

The aforesaid collar 20 extends into the path of movement of the gear 12 when the latter is moved rearwardly for engagement with the reverse idler gear 13 as aforesaid. The arrangement is such that when the gear 12 is shifted into engagement with gear 13 for establishing the reverse drive, provided that the mechanism is set to properly effect reverse as will be presently apparent, collar 20 will be engaged toward the latter part of the movement of gear 12 so as to move the collar together with the hub 29 rearwardly or to the right as viewed in Fig. 2, thereby shifting the sleeve 16 and clutch 17 rearwardly to engage teeth 30, 36 to lock out or render the overrunning clutch D ineffective by providing a two-way drive between shafts 14 and 10. During the aforesaid rearward shifting movement of hub 59, spring 65 will be compressed so that on release or forward movement of the gear 12, the parts will be restored to the positions thereof illustrated in Fig. 2 provided, however, that other controls for the shiftable parts are positioned to accommodate such return movement as will be presently apparent. When hub 59 moves rearwardly, as aforesaid, rod 61 is maintained against rearward movement by spring 68ˡ acting in the position shown by the full lines in Fig. 5. Hub 59 thus slides rearwardly on rod portion 60 and sleeve 63.

In addition to the aforesaid manually operated means for shifting the position of clutch 17 in response to a setting of the reverse gearing of transmission B, we have also provided a further manually controlled means for shifting the clutch 17, at times when permitted by our improved controlling means, independently of the movement thereof under the influence of the reverse setting of the transmission. To this end, the aforesaid Bowden wire 68ᵈ as diagrammatically illustrated in Fig. 3, extends for convenient manipulation by the vehicle driver, such position being indicated by the usual dash 69 which mounts a handle or knob 70 connected to the other end of the Bowden wire 68ᵈ. The handle 70 is adapted for movement by the hand of the vehicle driver, this handle being guided from its position illustrated in Fig. 3 to a position in spaced relationship from dash 69, in which extended position the guide portion 71 of the handle registers a notch 72 thereof with spring pressed plunger 73 carried by a guide block 74.

Figure 3:
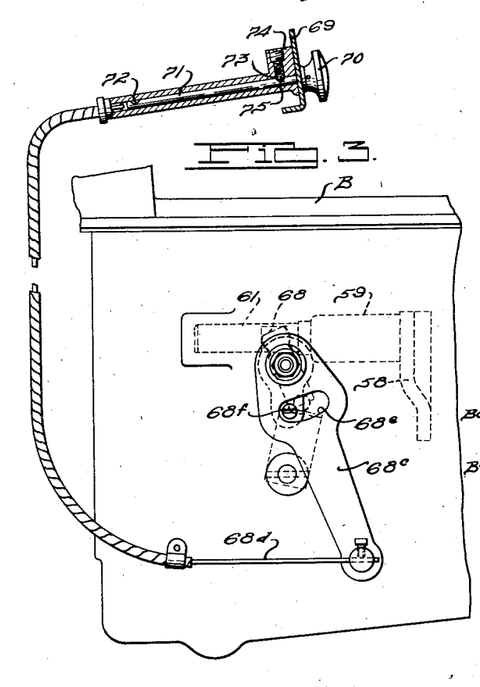
Fig. 3 is a side elevational view of a portion of the mechanism shown in Fig. 2.

The plunger 73 and the notches 72 and 75 engageable therewith cooperate to advise the operator of the proper positioning of handle 70 for effecting the desired movement of the shiftable sleeve 16 and clutch 17. Furthermore, the plunger 73 when in the Fig. 3 position assists spring 68ˡ in holding rod 61 fixed against rearward movement when clutch 17 is moved rearwardly by the reverse gear 12 as aforesaid. In Fig. 3 it will be noted that the plunger 73 is illustrated in engagement with the notch 75 and in this position spring 65 is acting to move the clutch 17 forwardly or to the position illustrated in Fig. 1. In this position the teeth 30 of clutch 17 are free from engagement with the teeth 33 of the outer free wheeling clutch member 34.

It will be noted that when handle 70 is pulled outwardly from dash 69, lever arm 68ᶜ will move cylinder 68ʲ and plunger 68ᵍ to the dotted line position, spring 68ˡ acts rearwardly on rod 61 as soon as the angle of the cylinder and plunger reverses, the spring 68ˡ acting on rod 61 and hub 59 to shift sleeve 16 and clutch 17 to engage teeth 36 and 30, this shifting movement of the clutch 17 under control of the handle 70 and under power of spring 68¹ being independent of a similar clutch shifting movement under the influence of reverse gear 12. When hub 59 is thus moved rearwardly the spring 65 is not further compressed since hub 59 engages shoulder 66. Rod 61, hub 59, spring 65 and sleeve 63 thus move as a unit. The manual control is thus made with very little effort required. In returning handle 70, the spring 68¹ snaps past its center line position and then acts to move rod 61 forwardly to restore clutch 17 to the Fig. 1 position, rod 61 acting through spring 65 against hub 59. Our mechanism is also of advantage in holding clutch 17 in its positions of shift against undesired displacements. It will be apparent that when gear 12 is shifted to engage the reverse gear 13, such movement is effective to shift the clutch 17 rearwardly into engagement with teeth 36 as aforesaid, hub 59 separating from its otherwise normally engaging position against shoulder 66. When the clutch 17 is shifted rearwardly by engagement of notch 72 with ball 73, the clutch device will be maintained in the aforesaid shifted position until the handle 70 is restored to the position illustrated in Fig. 3 whereupon spring 68¹ will act to restore the clutch to its position illustrated in Fig. 1.

Referring now to the details of the clutch C which is preferably of the automatic type, one embodiment thereof being best illustrated in Figs. 7, 8 and 10, the pawl cage 52 is provided with diametrically arranged pairs of lateral extensions or pawl guides 76 and 77. Extensions 76 pawl engaging faces 78 and extensions 77 have similar bearing faces 79. Fitting within shell 54 are a pair of the said pawls 51, each having a face in sliding engagement with a face 78 of extension 76 and each extending generally inwardly of the pawl carrying cage. Thus, each pawl is formed with a yoke portion 80 normally seated on an extension 77, each yoke portion having a guide counterbalancing portion 81 slidable intermediate a face 79 and the sides of the other pawl opposite the sides thereof in engagement with the face 78.

The face or side of each pawl 51 which slides against a face 78 has been designated by reference character 82 and this side of the pawl may be referred to as the coast side. The opposite side or face of each pawl 51 is indicated at 83 in sliding contact with the face 84 of the guide portion 81 of the other associated pawl. The drive side or face of each pawl 51 is indicated at 85 and it will be noted that this side 85 is offset from the side 83. Each pawl 51 has an outer cam face 86, it being noted that the drive side is spaced somewhat farther from the inner surface of shell 54 than the spacing of the other extremity of the coast side 82, when the clutch C is disengaged as shown in Fig. 10, so that the cam face 86 may be said to extend forwardly and radially inwardly of the direction of rotation of the clutch as indicated by the arrow 87 in Fig. 7. It will be noted that with the pawls 51 positioned as illustrated in Fig. 10, the cam face 86 at its highest point at the outer extremity of the coast side 82 has a small clearance with the inner surface of the slot carrying shell 54.

In order to normally urge the pawls 51 inwardly of the pawl cage 52 to position the parts as shown in Fig. 10, primary yielding means such as springs 89 are provided, each spring acting on the head 90 of a screw bolt 91 threadedly engaging suitable openings in extensions 77, the yoke portions 80 being also provided with suitable openings so as to slidably receive the respective bolts 91 and springs 89 cooperating therewith. Thus, the heads 90 of bolts 91 provide adjustable abutments for the compression of springs 89, these springs respectively acting at their operating ends on the yoke portions 80 of the pawls.

In order to provide a latching or locking action to correlate the manual operation of the shifting clutch 17 with the operation of clutch C, we preferably provide each pawl 51 with a projection or finger 92, adjacent the circular recessed portion 93 of the yoke portion 80 so that when clutch C is disengaged, as in Fig. 10, with the clutch 17 moved to lock out position of Fig. 9, the circular recess 93 of each pawl will fit around the main or large diameter part of sleeve 16 and thereby prevent the pawls 51 from moving outwardly. Sleeve 16 has an annular groove 94 at the forward reduced clutch forming end 17 thereof, this groove being bounded axially by teeth 39 and a shoulder 95 so that when sleeve 16 is in the Fig. 1 position, the pawls may move outwardly to engage clutch C, the projections 92 being carried into groove 94. However, with clutch C so engaged, the sleeve 16 and clutch 17 cannot be shifted rearwardly because of shoulder 95 engaging the projections 92. Disengagement of clutch C moves projections 92 clear of groove 94, then permitting rearward shifting of clutch 17 by handle 70 or else by operation of the aforesaid reversing mechanism.

It will be noted that shifting of sleeve 16 is rendered very easy and without binding since our drive from shaft 14 to teeth 53 and 36 is not taken axially along sleeve 16 but merely through the forward end hub or clutching part 17 constituting a direct radial drive therethrough.

The shell 54 has the aforesaid plurality of circumferentially spaced pawl receiving slots or openings 55 suitably spaced so that diametrically arranged pairs of slots will simultaneously register with the pawls 51 to receive said pawls under conditions hereinafter more apparent.

The threaded ends of screw bolts 91 permit adjustment of the springs 89 when the heads 90 of these bolts are registered with one of the slots 55 of shell 54, it being understood that the sleeve 49 and outer casing may have one or more aligned openings adapted for alignment with one of the slots 55 at the time of registration therewith of a bolt head 90 whereby adjustment of the primary springs 89 may be effected from without the overdrive casing, the openings in the aforesaid sleeve being shown at 95ᵃ. The casing opening 95ᵇ (see Fig. 1) is normally closed by a plug 95ᶜ.

When pawls 51 move outwardly into slots 55, such movement is limited by engagement of yoke portions 80 with projections 76, the yoke portions sliding on bolts 91.

Each pawl 51 is formed with a pocket 96 opening toward a face 84 of the associated counterbalancing guide portion 81 of the other pawl, each pocket 96 receiving secondary yielding means which may be in the form of a spring 97. Each spring 97 acts on a ball 98 movably housed within opening 96 adjacent the other end thereof. Each face 84 is provided with an inner ball receiving detent 99 and an outer ball receiving detent 100. Where it is desired to provide the outer detent 100 as well as the inner detent 99, these cooperating pairs of detents are spaced apart a distance equal to twice the radial or outward movement of each pawl 51, it being noted that when the pawls move outwardly together, the pawl 51 and associated guide 81 of the other pawl move in opposite directions and to the same extent. The purpose among other things of the detents 99 and 100 is to control the movement of the pawls so that they will quickly move outwardly and inwardly without "hunting" tendency.

In the operation of our improved driving mechanism, as thus far described, let it be presumed that the motor vehicle is being driven by the engine forwardly in direct drive with the clutch device 17 in the Fig. 1 position but at a speed below that necessary for the centrifugal force to overcome the resistance of springs 89 and detents 98. Under such conditions of normal drive, the drive shaft 14 provides a one-way direct drive to driven shaft 10 through the medium of the overrunning clutch D. During such drive the pawls 51 will be driven at the speed of drive shaft 14 and the slots 55 will be driven from the driven shaft 10 but at a slower speed by reason of the great train provided by the planetary gearing 48, 47 and 37.

The pawl springs 89 and detents 98 may be selected and adjusted for any desired speed of automatic engagement by clutch C for the overdrive and for purposes of illustration let it be presumed that this setting is such that the critical speed of engagement of clutch C takes place for approximately 45 miles per hour of vehicle travel. With the pawls driven from the engine, as illustrated, these pawls will be set so that they will be projected at a speed of the drive shaft such that when the engine is momentarily throttled down by a momentary release of the usual accelerator pedal, the speed of the slots 55 will remain approximately the same (assuming the vehicle does not perceptibly slow down during the overrunning action) and if such slot speed corresponded to 45 miles per hour or more of vehicle travel then when the pawls, on slowing down, synchronize in speed with the slots, the pawls will project into the slots to effect a smooth positive engagement of clutch C. As soon as engagement of clutch C takes place the drive from shaft 14 to shaft 10 is through the clutch C and planetary gearing to drive shaft 10 at a greater speed relative to driving shaft 14. At such time the overrunning clutch D is rendered automatically inoperative for any drive therethrough as soon as clutch C engages, the overrunning clutch portion 34 rotating faster than the inner cam portion 28 but in the same direction.

During the time that the drive shaft 14 is being slowed down as aforesaid to effect engagement of the clutch C at or above the critical speed thereof, the pawls go faster than the slots, the pawl cam faces 98 smoothly letting the pawls pass the slots. The pawls will pass the slots until the speeds of the pawls and slots synchronize, at which time the pawls move outwardly to engage the pawl coast faces 82 in the coast sides of the slots. On speeding up the engine, the pawl drive faces 85 then drive the engaged drive sides of the slots for the overdrive condition, the outer detents 100 being then engaged by ball 98.

On deceleration of the vehicle below the critical speed of clutch C as determined by the outer detents 100, the pawls are retracted by springs 89 and the drive then is automatically restored to a one-way drive through clutch D as before.

Whenever clutch device 17 is positioned as in Fig. 1, the automatic overdrive may take place and when clutch C engages, the pawl projections 92 lock the sleeve 16 against rearward shifting of the clutch 17 to lock-out position for cutch D.

At any time that clutch C is disengaged and the driver desires a direct two-way drive without free-wheeling, he may shift clutch 17 into engagement with teeth 36 whereupon the drive shaft will drive the driven shaft directly. In such position pawls 51 cannot move outwardly since the recesses 93 fit around sleeve 16 as shown in Figs. 9 and 10. Furthermore, it will be noted that our clutch 17 is adapted for shifting without releasing the drive to the pawl cage whereby "drifting" of the pawl cage is avoided when driving in the lock-out position of clutch 17. Thus, it is not necessary to synchronize the pawl cage and shiftable clutch 17 when returning to the one-way drive through clutch D, it being understood that when driving in the lock-out position of clutch 17 the pawls cannot fly out even when the rotation of the pawl cage is above the critical speed owing to the pawl recesses 93 fitting around sleeve 16.

The clutch 17 may also be shifted to the lock-out position by the manual reversing mechanism including the rearward slidable reverse gear 12 as aforesaid.

When in direct two-way drive, as when clutch 17 is in the Fig. 9 position, the clutch 17 is restored to the Fig. 1 position either by the hand operated member 70 or else by returning the reversing mechanism to a forward drive or to neutral.

If desired, the pawls 51 may be driven from the driven shaft and the slots driven from the driving shaft as will be readily apparent. The principles of such an arrangement are disclosed in the copending applications of Walter F. Ploetz Serial No. 707,052 and George L. McCain Serial No. 707,076 both filed January 18, 1934. Other changes in the illustrated mechanism may also be made as desired without departing from the spirit and scope of our invention as defined by the appended claims.

We will now describe our improved lubricating and cooling system for the power driving mechanism.

While we have illustrated the coaxial shafts 11, 14 and 10 as extending horizontally in Fig. 1, it is generally desirable according to present common practice to slightly incline the engine rearwardly and downwardly and our power driving mechanism is intended to be likewise inclined when installed in the motor vehicle. Thus, when so installed the normally horizontal line 101 indicates the normal rearward and downward inclination of the entire power driving mechanism as will be readily understood.

The transmission reservoir $B^{19}$ contains the usual supply of lubricant and at the rear of the transmission casing the reverse gears $B^7$ and 13 have their teeth so inclined that they pump the lubricant continuously from the reservoir $B^{19}$ rearwardly by throwing the lubricant from the periphery of the gears toward the aforesaid transverse partition wall 40. In the path of the lubricant thus thrown toward wall 40, the latter has an opening 102 therethrough (see Fig. 11) whereby the lubricant is continuously supplied to the reservoir $B^{20}$ of the overdrive mechanism A. A shelf or baffle 103 is located near the bottom of opening 102 to assist in the transfer of the lubricant by catching and guiding some of the lubricant falling on the baffle.

Figures 11, 12, 14:
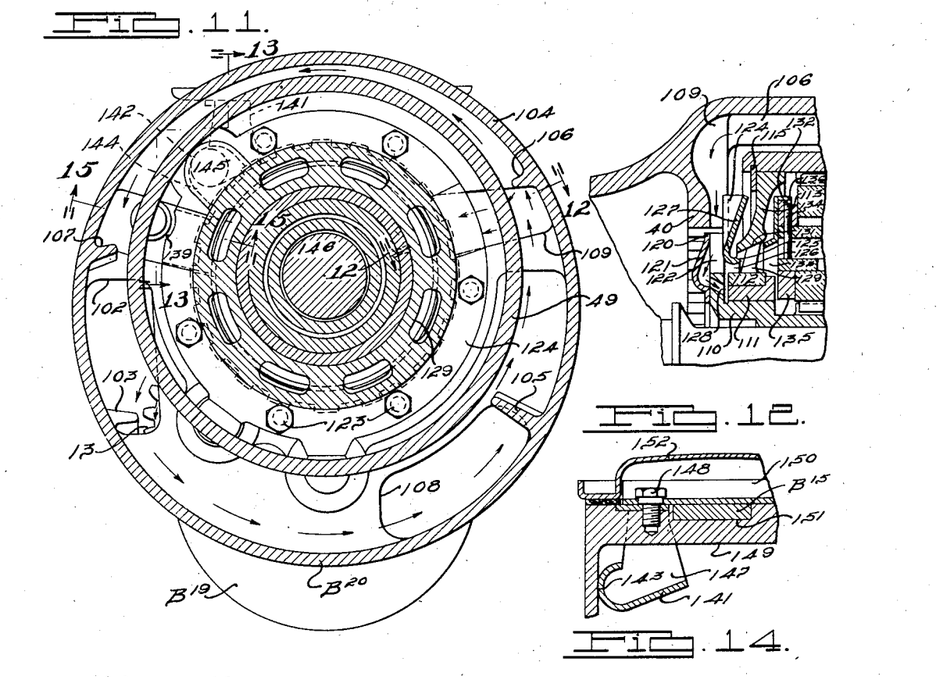
Fig. 11 is a sectional elevational view along line 11—11 of Fig. 1, illustrating the overdrive oil circulating means.
Figs. 12 and 13 are detail views taken respectively along lines 12—12 and 13—13 of Fig. 11.
Fig. 14 is a detail sectional view along line 14—14 of Fig. 13.

The lubricant thus introduced to the rear of wall 40 collects in the reservoir $B^{20}$ and is pumped or circulated therefrom through the overdrive mechanism by the following illustrative means. The casing 104, of which reservoir B$^{20}$ is a part, is cylindrical and has a series of lubricant guide baffles 105, 106 and 107 spaced circumferentially thereof, these baffles being of varying height, viz. the dimension toward the rotary cylinder 49, to locate their inner edges closely adjacent the cylinder, the latter being eccentric with respect to casing 104 as shown in Fig. 11. The axis of cylinder 49 is preferably vertically above that of casing 104 to provide a space at the bottom of the casing for the reservoir B$^{20}$.

With cylinder 49 rotating counterclockwise as viewed in Fig. 11, the cylinder 49 picks up the lubricant from reservoir B$^{20}$ and a portion thereof is thrown against baffle 105 which, as shown in Fig. 1, inclines forwardly and upwardly to guide the lubricant to an opening 108 in the wall 40. Thus, a portion of the lubricant is returned from reservoir B$^{20}$ directly to reservoir B$^{19}$ tending to maintain a uniform level of lubricant in these reservoirs and to also circulate the lubricant for cooling purposes as will be presently apparent.

A portion of the lubricant which escapes baffle 105 is carried by cylinder 49 and thrown off toward baffle 106, a remaining part which escapes baffle 106 being carried around by the cylinder for discharge against baffle 107.

The baffle 106 likewise slopes forwardly and upwardly to discharge lubricant guided thereby forwardly to a vertical passage 109 in wall 40, this passage being open only downwardly for lubricant discharge and rearwardly for lubricant entry.

The aforesaid sun gear 37 has a forward hub 110 (see Fig. 12) adapted to journal the forward end of cylinder 49. Thus, hub 110 has a bearing member 111 journalling the hub 112 of the spider or support 113 held for rotation with cylinder 49 between shoulder 114 and the abutment ring 115. The sun gear hub 110 has a forward and upward annulus 116 terminating outwardly in the peripheral teeth 117 which engage corresponding teeth 118 to form a central opening in wall 40 through which shaft 14 and sleeve 16 project. The wall opening has a shoulder 119 against which the annulus 116 bears to limit forward movement of the sun gear 37, the latter being held fixed by the engaged teeth 117 and 118.

Riveted to the front face of annulus 116 is a stamped annular plate 120 which, inwardly of passage 109 at the section shown in Fig. 12, has a forwardly deflected portion 121 cooperating with a radial passage 122 in annulus 116 to form an inwardly extending passage for lubricant discharged from passage 109.

Figure 15:
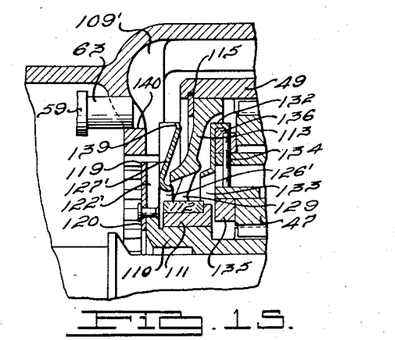
Fig. 15 is a further detail sectional view along the line 15—15 of Fig. 11.

Secured by screw bolts 123 to the rear face of wall 40 is a stamped annular plate or shield 124 which is flat except at sections 12—12 and 15—15. The inner edge of plate 124 is flared at 125 rearwardly and is spaced from hub 112 to provide an annular lubricant passage 126 in continuous communication with passage 122. At section 12—12 opposite passage 109 plate 124 is flared rearwardly at 127 to provide a funnel-like lubricant entry between passages 109 and 12 so as to catch the lubricant from passage 109 and conduct the same downwardly for discharge rearwardly from passage 126 and form a further conduit or passage 128 at the lower end of annulus 116. The plates 124 and 120 thus provide rear and front walls for the annulus passage 122.

The rotating spider 113 has a plurality of spaced passages 129 therethrough for periodic and successive registration with conduit 126 whereby lubricant is discharged therethrough to the axial passages 130 in the planetary shafts 45. The outer walls of spider passages 129 are flared rearwardly and outwardly at 131, the forward ends thereof overlying the flare 125 to efficiently conduct the lubricant and, by reason of the centrifugal force acting on the lubricant at passages 129, a suction is created tending to forcibly withdraw the lubricant from annular passage 126.

Secured to the planet shafts 45 is a lubricant passage forming plate or ring 132 having a forwardly bent lower annular flange 133 adapted to overlap the rear edges of the flares 131 closely adjacent thereto as the spider passages 129 rotate relative to the rotating planet shafts 45. In order to secure plate 132 with shafts 45, the latter receive pins 134 which project outwardly into a ring 135, the plate 132 having its outer edge spun around a forward shoulder 136 of ring 135. The shaft passages 130 have a radial passage 137 for supplying lubricant to bearings 46 and rear outlets 138 for supplying lubricant to the movable parts of clutch C. The lubricant at bearings 46 and such lubricant as may pass between flange 133 and flares 131 will reach the planetary gearing for lubricating same.

Thus, in operation, the baffle 106 picks up and deflects the lubricant thrown by centrifugal force from cylinder 49, conducting the lubricant through stationary conduits or passages 109, 122, 126 and 128. The lubricant discharged at 126 periodically enters the planet shaft passages 130 to lubricate the various parts of the planetary gearing and automatic clutch C while the lubricant discharged at 128 lubricates the bearing of spider 113, working rearwardly to sun gear 37. The lubrication is by force, being under the pressure of the centrifugal action caused by rotation of cylinder 49.

Referring now to Figs. 1, 5, and 15, the baffle 107 slopes forwardly and downwardly. In Fig. 1 this baffle is in front of the section but baffle 107 is shown in construction lines to indicate its slope. Thus, baffle 107 is sloped oppositely with respect to baffles 105 and 106 since it is on the downward rotational side of cylinder 49 as viewed in Fig. 11, the slope of baffle 107 also utilizing the force of gravity to conduct the lubricant forwardly to a system of passages shown in Fig. 15 which is very similar in construction and purpose to the passages of Fig. 12. Corresponding parts are indicated with primed reference numerals and will only be briefly referred to since the operation and structure will be apparent from the foregoing description of the Fig. 12 parts.

Thus, baffle 107 supplies lubricant forwardly to passage 109', thence downwardly through annulus passage 122', plate 120 being flat since the passage 128 of Fig. 12 is omitted. Plate 124 is likewise flared at 127' and the top of the flare has a notch 139 to accommodate rear movement of the rear end of rod 61 and sleeve 63 when displaced by knob 70 as aforesaid. The sleeve 63 thus slides in opening 140 to permit rod 61 to project across passage 109' and beyond notch 139 without interference. Lubricant ejected at 126' also periodically passes through spider passages 129 for the same purpose as in the Fig. 12 description.

Figure 13:
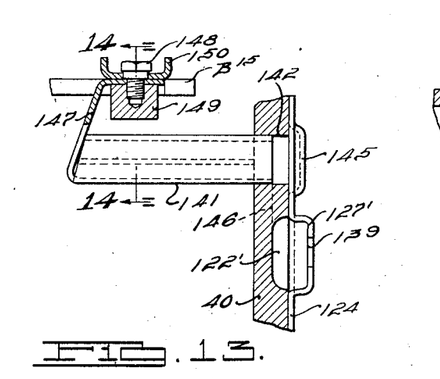

With the view of supplementing the aforesaid supply of lubricant to passage 122' of the sun gear annulus 116, we have provided means for catching a portion of the lubricant thrown from the transmission gears and draining such lubricant under gravity feed to the passage 122'. This is best shown in Figs. 11, 13 and 14 wherein an upwardly opening trough 141 projects forwardly from an opening 142 in wall 40 above and to one side of gears B⁸, 12, and 13, these gears rotating to throw lubricant therefrom into trough 141, the curved wall 143 thereof deflecting the lubricant into the trough. This trough, when the transmission is tilted rearwardly as aforesaid, drains lubricant which flows rearwardly through opening 142 and downwardly through annulus passage 144 closed rearwardly by the bulged part 145 of plate 124, passage 144 communicating with passage 122' by a passage 146.

The trough 141 is supported forwardly by an arm 147 thereof which is secured by fastener 148 between the transverse casing bridge 149 and the channel 150. The bridge 149 is grooved to slidably accommodate the shifter rails B¹⁵, one groove being shown at 151 in Fig. 14. Bridge 149 and channel 150 thus prevent vertical displacement of the shifter rails. A sheet metal cover 152 removably closes the top of the transmission.

Where the automatic clutch C is set to engage at relatively high vehicle travelling speed, such as referred to hereinbefore, it will be apparent that when the overdrive mechanism becomes active as a drive, the transmission B will ordinarily be in direct drive so that there is no loading of the transmission gears. The heat generated in the overdrive mechanism A by reason of the operating gearing, bearings, and other working parts, is dissipated by the circulation of the lubricant to the transmission B, the latter acting as a cooling reservoir. When the transmission B is driving through a pair of its reduction gears, the overdrive mechanism A is running "light", viz. there is no vehicle power drive through the planetary gearing.

By reason of our invention, the alignment of the various shafts and rotatable assemblies is made more accurate, easier to manufacture and less costly. For example, one further feature of our invention resides in the provision of the support for the forward end of the cylinder 49 in the wall 40, being centered therein by spider 113 the sun gear annulus 116 independently of shaft 14, the latter having a two point bearing support at 15 and 26. These two points are easily and accurately lined up without any tendency to deflect the shaft at any intermediate point from any misaligned bearing. Furthermore, the shaft 14 being free of the sun gear 37 but co-axial therewith, provides a space for the shiftable sleeve 16, simplifying the control for the clutches C and D. The casing for transmission B and overdrive mechanism A is preferably unitary including the wall 40, this unitary casing providing the bearing B', the sun gear and cylinder support at teeth 118, the rear cover 153 providing the bearing 22 for supporting the rear portion of driven shaft 10.

As a further feature of our invention, we have provided means for freeing any foreign particles from collecting in the overdrive mechanism where they might otherwise injure the working parts. Thus, the flange 154 which connects clutch member 34 and cylinder 49 has a plurality of radial passages 155 between screw bolts 50, these passages opening inwardly to the radial passages or spaces 156 of an annular corrugated stamped plate 157. The plate passages 156 open inwardly just rearwardly of teeth 36 so that any chips or other foreign particles tending to accumulate at the teeth 30, 36, 53 and along shaft 14 will pass outwardly by centrifugal force and with the flow of the circulating lubricant through passages 156 and 155 to accumulate harmlessly in the reservoir B²⁰. The plate 157 provides a rear wall for the passages 156 thereby protecting bearing 26 from foreign particles conducted outwardly through the forwardly extending hollow portion of the driven shaft. The inner edge of plate 157 is deflected at 158 toward the side of cam 28 to further protect bearing 26 from foreign particles, these particles being guided by edge 158 outwardly into passages 156.

As will be noted in Fig. 1, the baffles 105, 106 and 107 preferably terminate rearwardly short of the plane of passages 155 so that foreign particles discharged therefrom do not lodge on these baffles since otherwise they might be carried by the lubricant into circulating system for the overdrive mechanism.

As a further feature of our invention, it will be noted that according to the preferred embodiment of our invention as illustrated, the casing structures for the transmission B and overdrive mechanism A including the transverse wall 40 are preferably integrally formed as by a unitary casing. This has the advantage of increasing the heat transfer between the casing structures thereby adding to the efficiency of the lubrication cooling system. The flat walls of the transmission casing structure provide large cooling surfaces for efficiently cooling the oil heated by the transmission and overdrive mechanism, the oil being continuously thrown to said walls by the transmission gears. A further advantage of our unitary casing structure resides in providing and maintaining accurate alignment of the various shafts associated with the transmission and overdrive whereby springing or misalignment of the shafts is avoided and the mechanisms operate with an improved quietness and long life.

We claim:

1. In a motor vehicle power transmission having a speed ratio changing mechanism and an auxiliary driving mechanism operably connected thereto, casing structures for each of said mechanisms, one of said casing structures providing a lubricant reservoir, means responsive to operation of said mechanisms for causing circulation of lubricant from said reservoir to the other of said casing structures for lubricating the mechanism thereof and thence back to said reservoir, a wall structure dividing said casing structures from each other and having a passageway for returning lubricant from the casing structure for said auxiliary mechanism to the casing structure for said speed ratio changing mechanism, said auxiliary driving mechanism including a plurality of gears, means for supporting one of said gears from said wall structure, said auxiliary driving mechanism further including a rotary cylinder operably connected to said gears, and means responsive to rotation of said cylinder for conducting lubricant picked up by and thrown from said cylinder into separate paths respectively directed through said wall passageway and to lubricate said gears.

2. In a motor vehicle power drive having a speed ratio changing mechanism and an auxiliary driving mechanism operably connected thereto, casing structures for each of said mechanisms, a wall between said casing structures, one of said casing structures providing a lubricant reservoir, means responsive to operation of said mechanisms for causing circulation of lubricant from said reservoir to the other of said casing structures for lubricating the mechanism thereof and thence back to said reservoir, said speed ratio changing mechanism including a rotary helical reverse driving gear disposed adjacent said wall and adapted to throw said lubricant toward the other of said casing structures, said wall having a lubricant conducting opening therethrough in the path of the lubricant thrown from said reverse gear, and auxiliary means for collecting lubricant thrown about in said first casing, in response to operation of said speed ratio mechanism, and conducting said collected lubricant by gravity to said second casing.

3. In a power driving mechanism, a casing structure adapted to receive lubricant, a driving shaft, a driven shaft, said driven shaft having an enlarged end within said casing for receiving one end of said driving shaft, means including a gear train within said enlarged end of the driven shaft for driving said driven shaft from said driving shaft, said enlarged end having a passage extending generally radially therethrough, and a plate in said passage adapted to guide foreign particles outwardly therethrough.

4. In a power driving mechanism, a casing structure adapted to receive lubricant, a driving shaft, a driven shaft, said driven shaft having an enlarged end within said casing for receiving one end of said driving shaft, means including a gear train within said enlarged end of the driven shaft for driving said driven shaft from said driving shaft, said gear train including a planetary pinion engaging said enlarged end, a hollow shaft journalling said pinion, and a sun gear, an annular member adapted to secure said sun gear to a part of said casing, said casing part and annular member having radially aligned communicating lubricant conducting passages, and means responsive to rotation of said enlarged end for conducting said lubricant to said communicating passages, and means for conducting said lubricant from said passages to said hollow shaft, said gear train further including a centrifugal clutch operable within said enlarged end adjacent said hollow shaft, said hollow shaft having an outlet passage adapted to supply lubricant therefrom to said clutch.

5. In a device of the character described, the combination with a casing, of a rotating member in said casing and planetary pinions mounted on bearings requiring lubrication, lubricant conduits respectively extending into each of said bearings and parallel with the axis of said member, a rotatable support for one end of said member extending adjacent one end of said bearings transversely of said bearing conduits, said support having a lubricant passage extending in the general direction of said axis, an annular plate overhanging the ends of said bearings, a stationarily mounted plate having a central opening and a flange adjacent said opening and entering one end of said lubricant passage during rotation of said support, said annular plate having a central opening and a flange adjacent thereto entering said lubricant passage at the other end thereof during rotation of said support, and means for conveying lubricant picked up by said rotating member within said casing on one side of said stationarily mounted plate to the other side thereof, the lubricant thus conveyed flowing through the opening in said stationarily mounted plate, through said lubricant passage and through the opening of said annular plate.

6. In a device of the character described, the combination with a casing, of planetary gearing in said casing including a rotating member and planetary pinions mounted on bearings requiring lubrication, conduits respectively extending through each of said bearings parallel with the axis of said member for conducting lubricant into said gearing, a rotatable support for one end of said member extending adjacent one end of said bearings transversely of said bearing conduits, said support having a lubricant passage extending in the general direction of said axis, an annular plate carried with said conduits and having a portion thereof overhanging the inlet ends of said conduits, a plate stationarily secured to a wall of said casing and having a portion thereof spaced apart therefrom, said stationary plate having a central opening therein and an annular flange surrounding said opening and projecting into said passage during rotation of said support, and means for conveying lubricant picked up by said rotating member within said casing on one side of said stationary plate to the opposite side of said stationary plate and into the said space between said casing wall and said spaced portion of said stationary plate, the lubricant thus conveyed flowing through the opening in said stationary plate, through said passage and through the opening of said annular plate.

7. In a device of the character described, the combination with a casing, of a planetary gear mechanism comprising a member rotatably mounted in said casing and including pinions mounted on bearings, conduits extending through the axes of said bearings respectively, a rotatable plate mounted on said gear mechanism and overhanging the entrance to said conduits, a fixed plate secured to said casing, said fixed plate having a central opening therein and an annular flange surrounding said opening, a rotatable support for one end of said member extending adjacent one end of said conduits, said support formed with a lubricant passage overhanging said annular flange during rotation of said support, and baffles mounted on the side walls of said casing adapted to collect lubricant splashed by rotation of said planetary gear mechanism on one side of said fixed plate and deliver the same to the opposite side of said fixed plate, the lubricant thus conveyed flowing through the opening in said fixed plate and thence through said passage and into said rotatable plate.

8. In a device of the character described, the combination with a casing, of a planetary gearing having an internal ring gear rotatably mounted in said casing, said planetary gearing further including pinion gears meshed with said internal ring gear, hollow spindles for the pinion gears having radial openings therein, a pinion gear carrier, a ring secured on said pinion gear carrier and rotatable therewith and overhanging one of the ends of each of said spindles, a shield stationarily mounted on said casing and having a central opening therein, a rotatable support for one end of the internal ring gear provided with a lubricant passage, said shield having a flange surrounding its said opening and projecting into said passage during rotation of said support, and means for conveying lubricant picked up by a rotating member of said planetary gearing on one side of said shield to the opposite side of said shield, the lubricant thus conveyed flowing through said shield opening and support passage and into said ring.

9. In a device of the character described, the combination with a casing, of a planetary gearing including a rotary internal gear member and planetary pinions mounted on bearings requiring lubrication, a support for one end of said rotary member adjacent said pinions, lubricant conduits respectively extending into each of said bearings and parallel with the axis of said member, an annular ring overhanging one of the ends of each of said bearings and rotatable therewith on one side of said support, a stationary shield adjacent the other side of said support, said shield having a portion thereof spaced from a wall of said casing to provide a lubricant passageway, means for conveying lubricant picked up by said rotary member within said casing on one side of said shield to the opposite side of said shield and into said passageway, and means for conducting lubricant from said passageway through said shield and support and into said annular ring for passage of the lubricant into said bearing conduits.

10. In a device of the character described, the combination with a casing, of a planetary gearing mounted in said casing including a ring gear, a stationarily mounted sun gear, pinion gears nested between said ring and sun gears, pinion shafts for said pinion gears, lubricant conduits extending through said shafts to the interior of said gearing, an annular ring mounted to rotate with said pinion shafts and overhanging one end of each of said conduits, a shield fixed to said casing and having an opening extending from one side of said shield to the other toward said shaft conduits, a support for one end of said ring gear disposed between said annular ring and shield and having an opening therethrough, and means for delivering lubricant to that side of said shield opposite from said support, said lubricant flowing through said shield and support opening and into said ring, and from thence through said shaft conduits to the interior of said planetary gearing.

11. In a device of the character described, the combination with a pair of lubricant-receiving casings having a transverse wall therebetween, of change speed gearing in one of said casings and supplemental gearing in the other, said supplemental gearing including a rotary member and a plurality of operating parts requiring lubrication, said transverse wall having a pair of lubricant conducting openings therethrough, means responsive to operation of said change speed gearing for picking up lubricant from within the casing thereof and directing the same through one of said openings to the other of said casings, means for conveying lubricant picked up by said rotary member from within the casing of said supplemental gearing to said operating parts, and means responsive to rotation of said rotary member for conducting lubricant picked up by said rotary member and thrown therefrom forcibly through the other of said wall openings to the casing of said change speed gearing.

12. In a device of the character described, the combination with a pair of lubricant-receiving casings having a transverse wall therebetween, of change speed gearing in one of said casings and supplemental gearing in the other, said supplemental gearing including a rotary member and a plurality of operating parts requiring lubrication, said transverse wall having a pair of lubricant conducting openings therethrough, means responsive to operation of said change speed gearing for picking up lubricant from within the casing thereof and directing the same through one of said openings to the other of said casings, and means for conveying lubricant picked up by and thrown from said rotary member in separate paths respectively to said operating parts and through the other of said wall openings back to said change speed gearing casing.

13. In a device of the character described having a pair of adjoining lubricant-receiving casings and a wall therebetween, said wall having a pair of lubricant conducting openings therethrough, change speed gearing in one of said casings, planetary gearing in the other of said casings including a rotatable member and a plurality of planetary pinion bearings requiring lubrication, means responsive to operation of said change speed gearing for directing lubricant from the casing thereof through one of said wall openings to the other of said casings for contact with said rotatable member, and means for conducting and directing lubricant picked up by and thrown from said rotatable member in separate paths respectively to said bearings and through the other of said wall openings back to said speed ratio changing casing.

14. In a device of the character described having a pair of adjoining lubricant-receiving casings and a wall therebetween, said wall having a pair of lubricant conducting openings therethrough, change speed gearing in one of said casings, planetary gearing in the other of said casings including a rotatable member, a plurality of planetary pinion bearings requiring lubrication and a support for one end of said rotatable member between said wall and pinion bearings, means responsive to operation of said change speed gearing for directing lubricant from the casing thereof through one of said wall openings to the other of said casings for contact with said rotatable member, means for conveying lubricant picked up by and thrown from said rotatable member in separate paths respectively from one side of said support to the other side and through the other of said wall openings back to said speed ratio changing casing, and means for conducting lubricant from the last said side of said support to the other side thereof within said rotatable member and to said pinion bearings.

15. In a power driving mechanism, a transmission gearing and housing therefor having a lubricant reservoir, a casing adjacent said housing and adapted to receive lubricant, a wall transversely separating said housing and casing and having a lubricant passageway therethrough for placing said casing in communication with said housing, a driving shaft, a driven shaft, means within said casing including a gear train for driving said driven shaft from said driving shaft, said casing having a pair of lubricant deflecting baffles projecting inwardly therefrom, one of said baffles being disposed adjacent said wall passageway for directing lubricant thereto for passage of the lubricant from said casing to said housing, a rotary element operably connected to said gear train and disposed adjacent said baffles whereby lubricant thrown from said rotary element is caught by said baffles and directed therealong in separate streams, and lubricant conducting means within said casing for distributing lubricant from the other of said baffles to said gear train.

16. In a device of the character described, the combination with a casing structure, of a planetary gearing within said casing structure and including a rotary internal gear member and planetary pinions mounted on bearings requiring lubrication, said gearing further including a sun gear structure anchored to said casing structure, said structures being provided with communicating lubricant passages for supplying lubricant to said pinion bearings, means supporting one end of said internal gear member on said sun gear structure, said supporting means having an opening accommodating passage of lubricant from one side thereof to the other to pass lubricant from said communicating passages to said pinion bearings, and means for introducing lubricant to one of said communicating passages.

17. In a device of the character described, the combination with a casing structure, of a planetary gearing within said casing structure and including a rotary internal gear member and planetary pinions mounted on bearings requiring lubrication, said gearing further including a sun gear structure anchored to said casing structure, a plate fixed adjacent said structures and cooperating therewith to provide a lubricant passage for supplying lubricant to said pinion bearings, means for introducing lubricant to said plate-forming passage, and means disposed between said plate-forming passage and said pinion bearings for supporting one end of said internal gear member on said sun gear structure, said supporting means having an opening accommodating passage of lubricant from said plate-forming passage to said pinion bearings.

18. In a device of the character described, the combination with a casing structure, of a planetary gearing within said casing structure and including a rotary internal gear member and planetary pinions mounted on bearings requiring lubrication, said gearing further including a sun gear structure anchored to said casing structure, said structures being provided with communicating lubricant passages for supplying lubricant to said pinion bearings, means supporting one end of said internal gear member on said sun gear structure, said supporting means having an opening accommodating passage of lubricant from one side thereof to the other to pass lubricant from said communicating passages to said pinion bearings, means for introducing lubricant to one of said communicating passages, and an annular ring overhanging one of the ends of each of said pinion bearings for guiding lubricant from the opening of said supporting means toward said pinion bearings.

19. In a device of the character described, the combination with a casing structure, of a planetary gearing within said casing structure and including a rotary internal gear member and planetary pinions mounted on bearings requiring lubrication, said gearing further including a sun gear structure anchored to said casing structure, said structures being provided with communicating lubricant passages for supplying lubricant to said pinion bearings, means supporting one end of said internal gear member on said sun gear structure, said supporting means having an opening accommodating passage of lubricant from one side thereof to the other to pass lubricant from said communicating passages to said pinion bearings, means for introducing lubricant to one of said communicating passages, and an annular ring overhanging one of the ends of each of said pinion bearings for guiding lubricant from the opening of said supporting means toward said pinion bearings, said annular ring having a marginal portion thereof deflected into said opening.

20. In a device of the character described, the combination with a casing structure, of a planetary gearing within said casing structure and including a rotary internal gear member and planetary pinions mounted on bearings requiring lubrication, said gearing further including a sun gear structure anchored to said casing structure, said structures being provided with communicating lubricant passages for supplying lubricant to said pinion bearings, means supporting one end of said internal gear member on said sun gear structure, said supporting means having an opening accommodating passage of lubricant from one side thereof to the other to pass lubricant from said communicating passages to said pinion bearings, means for introducing lubricant to one of said communicating passages, an annular ring overhanging one of the ends of each of said pinion bearings for guiding lubricant from the opening of said supporting means toward said pinion bearings, and a clutching structure drivingly connected to said planetary gearing disposed adjacent the other ends of said pinion bearings for receiving lubricant therefrom.

21. In a device of the character described, the combination with a casing structure, of a planetary gearing within said casing structure and including a rotary internal gear member and planetary pinions mounted on bearings requiring lubrication, said gearing further including a sun gear structure anchored to said casing structure, said structures being provided with communicating lubricant passages for supplying lubricant to said pinion bearings, a rotatable support for one end of said internal gear member, said support having a plurality of openings therethrough adapted to successsively register with said communicating passages for passing lubricant therefrom through said rotatable support of said pinion bearings, and means for introducing lubricant to one of said communicating passages.

22. In a device of the character described, the combination with a casing strucure, of a planetary gearing within said casing structure and including a rotary internal gear member and planetary pinions mounted on bearings requiring lubrication, support means for one end of said internal gear member, means for supplying lubricant to one side of said support means, and means for conducting lubricant from said supply side of said support to the other side thereof for lubricating said pinion bearings.

OTTO E. FISHBURN.
HERBERT F. PATTERSON.
RICHARD C. ALAND.